Patented Jan. 7, 1941

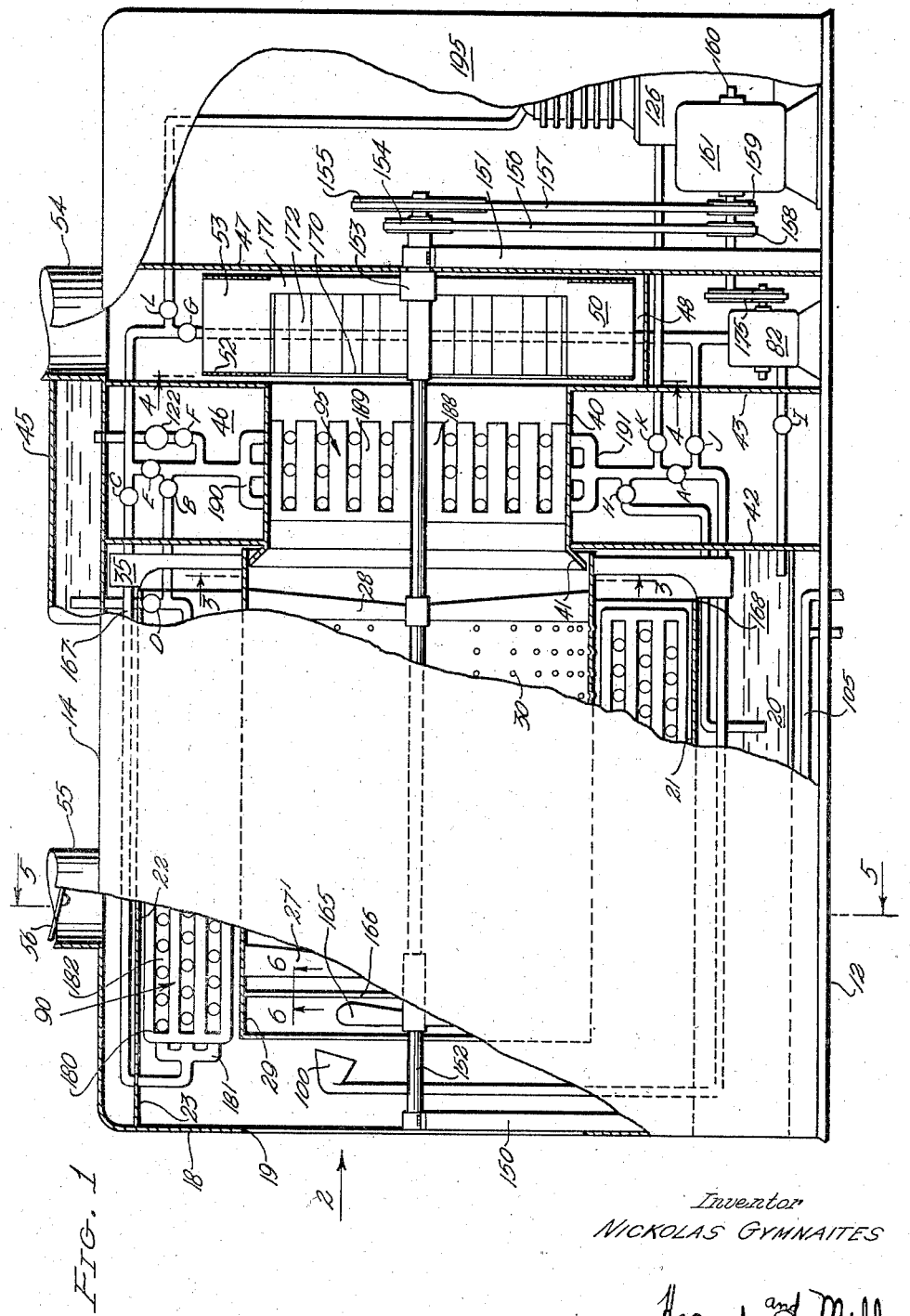

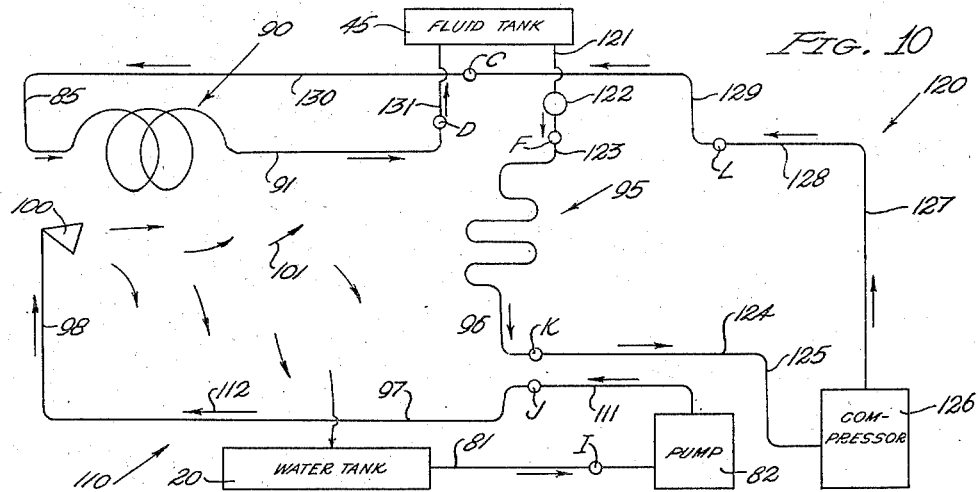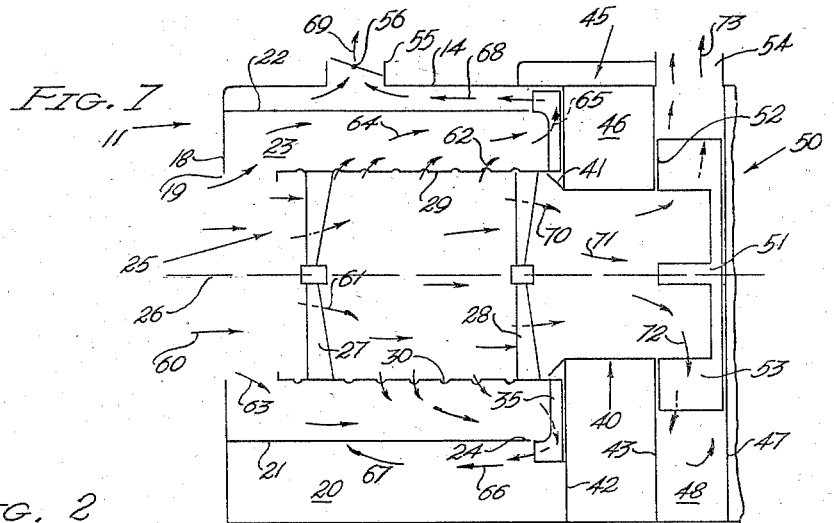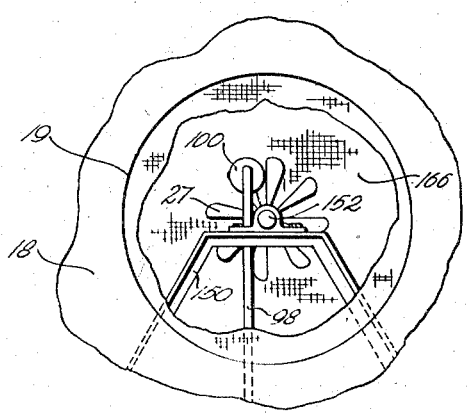

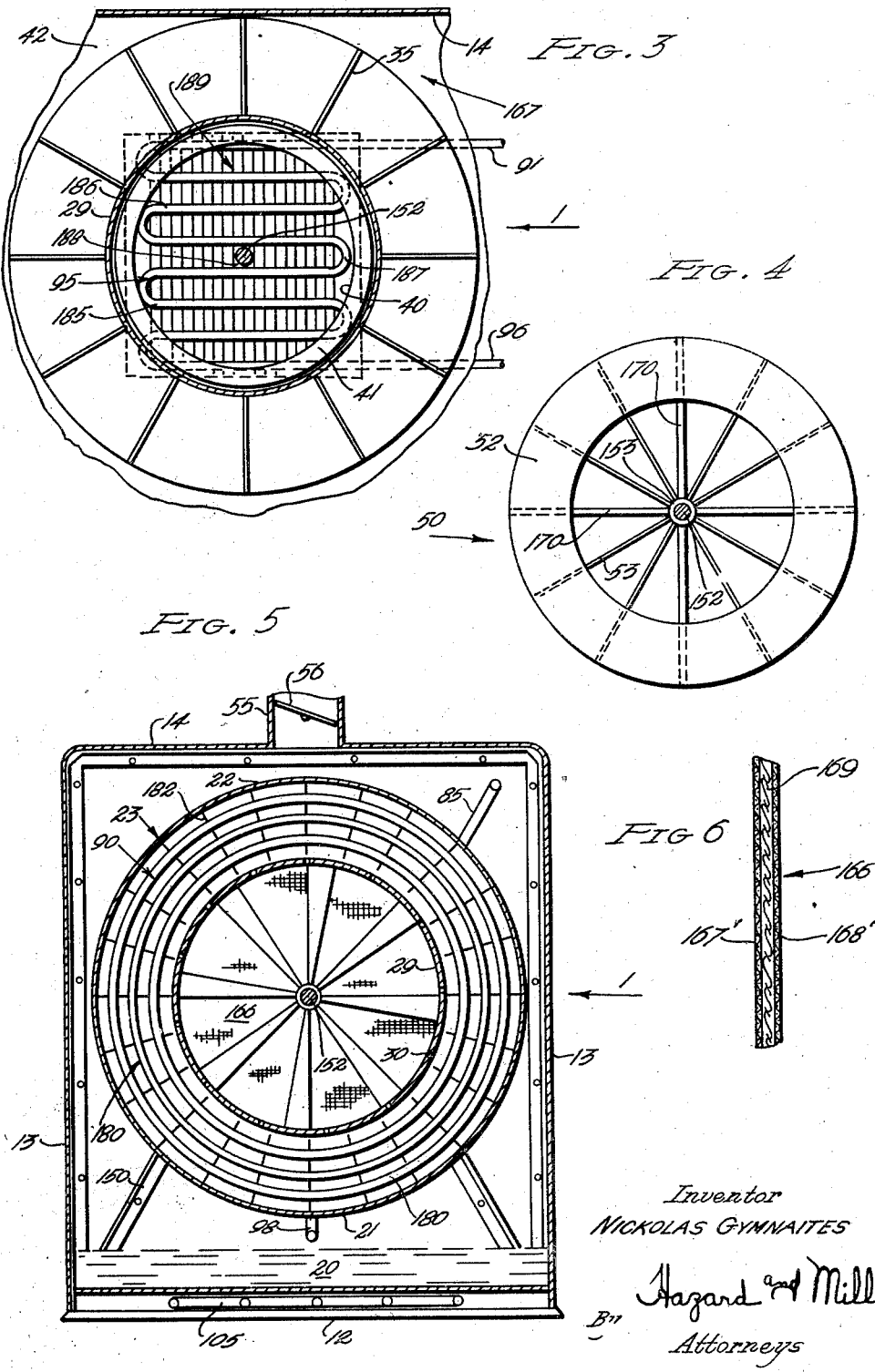

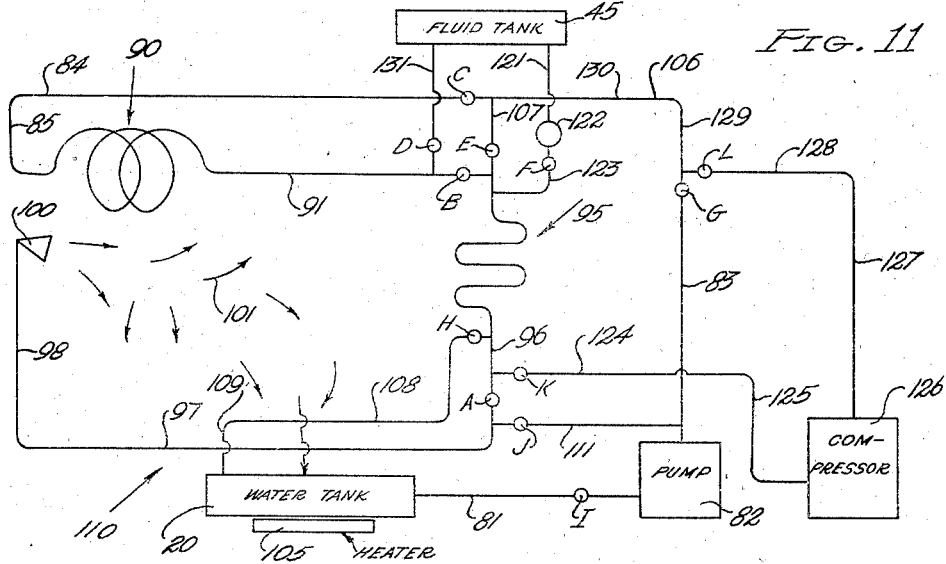
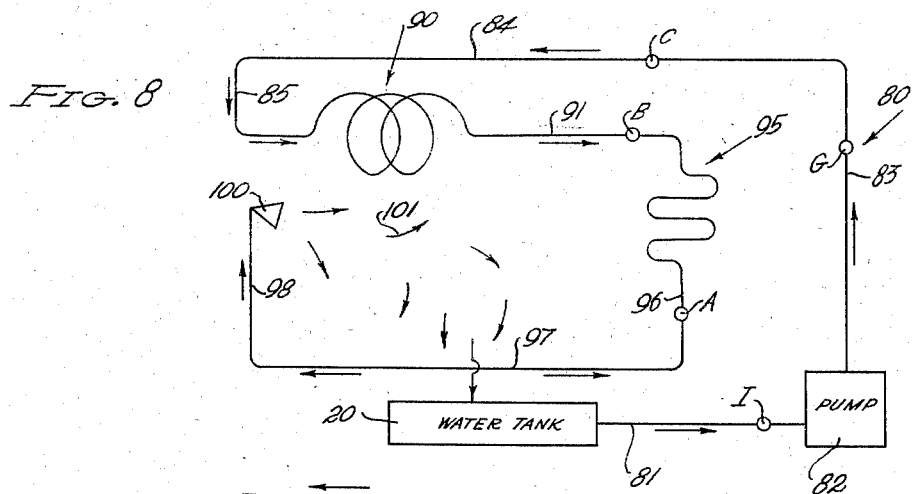
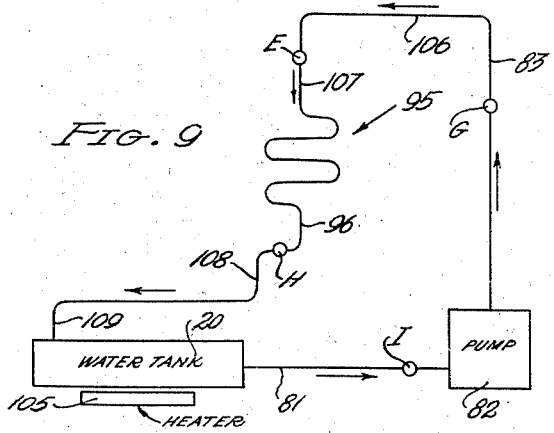

2,227,544

UNITED STATES PATENT OFFICE 2,227,544

AIR CONDITIONING EQUIPMENT

Nickolas Gymnaites, Ventura, Calif.

Application April 21, 1938, Serial No. 203,332

7 Claims. (Cl. 261—9)

My invention relates to a machine in which the term air conditioning includes cleaning and adding moisture to the air to be distributed in a room, building or the like, this incidentally having a cooling action. A further feature is using part of the equipment for air heating and in a further alternative procedure with the same general equipment, a positive refrigerating action may be developed.

A main object and feature of my invention is the construction of a machine in which a relatively large volume of air is conveyed through a rotating cylinder where it is subjected to a whirling and a centrifugal action. The flow of air is divided. The portion having the flow through the center is sucked or blown through a set of coils or the like which may be used for cooling by water, heating by hot water or refrigerated by passing a refrigerant through these coils. Such air is then forced by a blower preferably of a centrifugal type to ducts leading into the room or building. In connection with this feature of the air flow my invention includes a construction by spraying cool water into the air entering the cylinder or drum and providing devices for breaking the spray into minute particles in the nature of a mist. This immediately brings the complete flow of sprayed water into intimate contact and mixture with a large volume of air. A further feature of the operation is due to the centrifugal swirl of the air with the water vapors or mist developing a centrifugal separation of the larger globules of water, causing the particles of the mist to be forced outwardly by centrifugal action. Part of this water contacts the inside surface of the cylinder or drum and is discharged outwardly through perforations. A third feature of the action is that the centrifugal separation of the larger particles of water and the excessively moist air by centrifugal action is that relatively dry air is drawn through the center of the rotating cylinder or drum to contact the coils which may be designated as a radiator. The flow of this relatively dry air through the radiator coils may be utilized either to pre-cool the water of the spray to absorb heat when hot water flows through the radiator or to give up heat and become chilled when the equipment is used for refrigerating purposes. A further characteristic and feature of my invention involves subjecting the moist air carrying usually relatively large globules of water thrown outwardly by the centrifugal force to a centrifugal fan or blower which gives a positive urge outwardly, making a distinct separation of the flow of the whole body of air into an outer air mass, usually wet and saturated and the inner comparatively dry mass. In a further step of the procedure this wet mass of air is forced over water cooling pipes which may be used to cool the water before spraying. This mass driven outwardly is wasted by being discharged from the building or the like where the device is used for air conditioning.

My invention is illustrated in connection with the accompanying drawings, in which:

Fig. 1 is a side elevation partly broken away of my equipment taken in the direction of the arrow 1 in Figs. 3 and 5.

Fig. 2 is a front elevation broken away taken in the direction of the arrow 2 of Fig. 1.

Fig. 3 is a vertical transverse section on the line 3—3 of Fig. 1 omitting the outer parts of the machine, showing the heat transfer radiator.

Fig. 4 is a vertical transverse section on the line 4—4 of Fig. 1 in the direction of the arrows showing the centrifugal fan construction.

Fig. 5 is a vertical transverse section on the line 5—5 of Fig. 1 in the direction of the arrows.

Fig. 6 is a transverse section on the line 6—6 of Fig. 1 of a typical composite dispersion screen.

Fig. 7 is a diagram illustrating the direction of air flow of the complete machine.

Fig. 8 is a diagram showing the water circulation for air conditioning with water cooling.

Fig. 9 is a diagram showing the water circulation for air heating.

Fig. 10 is a diagram showing the water circulation and the refrigerated fluid circulation for air conditioning with refrigeration.

Fig. 11 is a diagram showing the water flow and the flow of the refrigerant and including the various valves to transform the machine to any one of the three systems of Figs. 8, 9 and 10.

Referring first to the construction for the air flow as shown diagrammatically in Fig. 7, this illustrates a housing construction 11 having a floor 12, opposite side walls 13, a top 14, a front wall 18 with a circular opening 19. Located within this housing there is a water tank 20 having its upper edge having its top defined by a top wall 21. Also spaced below the top 14 there is an upper horizontal partition 22. It is preferable to make the partitions 21 and 22 in the form of a stationary cylinder concentric with the rotor hereunder detailed, thus leaving an outside air space. This cylinder is designated by the numeral 23 and terminates at its inner edge 24.

A rotor assembly 25 has a suitable shaft, the axle of which is suitably journaled on the axis 26, the axle or shaft being suitably journaled. Secured to the shaft there are a plurality of combination air blower fans showing a forward fan 27 and a rearward fan 28. These also function to break up the spray of water hereunder designated. A cylinder or drum 29 is secured to these fans at their outer ends or to other suitable means connected with the shaft. The drum has a series of perforations 30 permitting outlet of air and also water as hereunder detailed. A waste air centrifugal fan 35 is secured to the drum positioned inwardly from the fan 28 and is designed to discharge the air outwardly by the centrifugal action of such fan.

A stationary contracted housing 40 may be cylindrical with a flared edge wall 41. A partition 42 connects with the neck or contracted housing 40 and forms a definite obstruction to the rearward flow of the circulating air outside of the drum or cylinder 29. There is also a rear transverse partition 43. A fluid tank 45 for a refrigerant is preferably located above the stationary housing 40 and resting on the top of the partitions 42 and 43. There is thus a dead air space 46 defined by the housing 40, the partitions 42 and 43, the bottom 12 and the fluid tank 45. There is an end transverse wall 47 spaced outwardly from the partition 43. This leaves an outside space 48 outside of a centrifugal fan hereunder detailed. A high speed centrifugal fan 50 is mounted on a hub 51 journaled on the shaft and rotated by any suitable means at a much higher velocity than the shaft. This includes a transverse baffle wall 52 and the radially extending blades 53. There is a discharge duct 54 for the air to be used in a room or building and a waste air duct or conduit 55 connected to the wall 14 or one of the outer walls 13. This has a control damper 56 utilized to shut off or control the opening of the waste air duct.

The direction of flow of air is indicated by the arrows in Fig. 7 in which the inflow of air is indicated by the arrow 60, this being drawn from the room or suitable place in the building. This enters through the opening 19 in the end wall 18. The air stream divides, a major portion thereof follows the arrow 61 through the cylinder or drum 29 being blown by the fans 27 and 28 which act as water beaters as hereunder detailed. This air is given a rotational whirl due to the shape of the fan blades and also by the drum 29 rotating. This causes a certain amount of the air to be carried outwardly by the centrifugal action in the direction of the arrows 62 through the perforations 30. Such air stream then joins or mixes with an outer air stream 63 diverted outwardly after entering at the opening 19. There is then an outer air flow around the drum in the direction of the arrows 64. Such air is driven by the centrifugal fan 35 outwardly as indicated by the arrows 65 whence at the top and sides it follows a channel or space between the cylinder 23 concentric with the drum 29 and defined as including the partitions 21 and 22 for it will be understood that if desired the air confining structure could be rectangular if it is desirable to have the outer housing rectangular in vertical cross section. This air follows the direction of the arrow 66, 67, 68 and is discharged as indicated by the arrow 69 to the waste duct 55. The flow may be controlled by the damper 56.

The central air flow not thrown out by the centrifugal action is diverted inwardly as indicated by the arrows 70 by the flare 41 and passes longitudinally as shown by the arrow 71 through the contracted housing or what might be termed a throat 40. This air is blocked by the transverse end wall 47 and is caught by the blades 53 of the centrifugal fan 50, this having the baffle wall 52 causing an outward flow of the air following the arrow 72. The air pressure built up in the space 48 causes a discharge following the arrow 73 through the duct 54 for conditioned air leading to a room or building. This also may be controlled by a damper if desired.

Dealing with the water flow used in conjunction with the air circulating system above described of Fig. 7, consideration is next directed to Fig. 8. The water tank 20 as above mentioned is installed in the bottom or lower part of the housing. This may be fed and kept supplied with water from any suitable source, the water level being preferably maintained by a float or equivalent valve. The pipe circuit designated by the assembly numeral 80 employs a supply pipe 81 from the tank to a water pump 82. This pump is driven in any suitable means and preferably by a connection to the shaft which operates the blower and centrifugal fans and the rotor above described. The pump is generally in a lower position in the cabinet or may be located outside of the fan and from the pump there is a riser pipe 83, a horizontal run 84, a drop pipe 85 leading to a water cooling coil 90. This coil may be quite an extensive arrangement of piping and is located outside of the drum 29, between such drum and the stationary cylinder 23 or where distinct partitions are used above the lower partition 21 and below the upper partition 22. The coils are thus located to be directly in the air draft indicated at 64 and in line with the air flow through the perforations 30 in the drum 29. A chilled water pipe 91 forms a partial return being connected to a heat transfer radiator 95. In this case the radiator functions with cool water to cool the air passing over such coils or radiator, the radiator being located in the throat or contracted portion 40 of the construction. In this radiator manifestly the temperature of the chilled water is usually increased as it absorbs heat from the air flow. A downwardly extending discharge pipe 96 continues with a horizontal lead 97, a riser pipe 98 terminating in a water jet 100. This is positioned closely contiguous to the outer end of the rotor drum 29 and sprays the water directly into such drum in such a position that it is caught by the blades of the fan 27 and broken up into small particles or atomized. Other devices for breaking up the water are described in more detail hereunder. Such water spray indicated by the arrows 101 develops a centrifugal swirl with the rotor cylinder 29 and a considerable portion of the large globules pass outwardly through the perforations in the drum. These collect in the cylinder 23 or drop directly to the bottom thereof or a partition such as 21 where this is utilized. The non-evaporated water then returns to the tank 20 by a downward drainage. Thus the replacement water only amounts to that lost in evaporation and carried outwardly in the waste air stream 69 and the conditioned air flowing in the direction of the arrow 73 in the duct 54 (note Fig. 7).

In the construction and operation in which the cooling coil 90 functions or is operative to cool either water or a refrigerant, the water or the refrigerant is circulated through the coils 90 which encircle the cylinder or drum. The water spray 100 discharges water directly into the path of the air flowing inwardly through the drum. A large proportion of this water is immediately acted upon by the fans and beaters and driven outwardly by centrifugal action through the perforated drum and comes in contact with the pipe coils 90. This consists of the larger globules of water. Manifestly a certain amount of the moist air is also carried outwardly where it has a sufficient moisture content to develop a centrifugal action and travel outwardly by centrifugal force. This air driven outwardly is somewhat cooled by the evaporation of the water into the air and also a mist of water and air is developed. The centrifugal blower 35 mounted on the rotor sucks this air and the water content thereof together with free drops of water to a certain extent rearwardly along the outside of the drum or cylinder 29. In addition air entering through the opening 19 in the front of the housing is sucked rearwardly through the cooling coils 90 by the centrifugal fan 35. This air is relatively dry. Such action creates a cooling of the coils 90 by the impact of the directly cooled air, the air containing a certain content of moisture and in addition water in the form of droplets or a film is deposited on the coils 90. The relatively dry air sucked rearwardly on the outside of the drum evaporates a certain amount of this water from the outside of the coils thus causing a heat transfer and a cooling of the coils and the water contained therein. All of the air whether moist or dry and the surplus moisture is discharged by the centrifugal fan 35 above the partition 23 and outwardly through the duct 55. This air may be considered as wasted so far as the direct ventilation and treatment of the air used in the room or building is concerned.

The relatively dry air which has not taken up much moisture from the water spray 100 and which has not been driven outwardly by centrifugal action flows longitudinally in the drum and mainly along the axis of the drum. This air is diverted inwardly by the flange 41 and through the contracted neck defined by the structure 40 where it flows over the radiator or heat transfer coils 95. The water flowing through these coils has been cooled by the cooling coils 90 where water and air cooling is used and thus there is a heat transfer between the relatively dry air and the cool water in the radiator 95. This causes a cooling of this relatively dry air which is then sucked through the equipment by the blower 50 constructed of a centrifugal type and blown outwardly through the ventilating duct 54 to the room to be ventilated. Manifestly where a positive refrigerating plant is utilized on account of the refrigerant in the radiator 95 being decidedly colder than the air, the air flowing through the neck 40 is materially cooled. Also where the water is heated as in Fig. 9 and flows through the radiator 95, such water is quite decidedly hotter than the air flowing over the radiator through the neck 40 and manifestly heats such air.

When the device is used as an air heater, suitable valves and the general piping system are closed and others opened as hereunder detailed to develop the circulation of the diagram of Fig. 9. This employs the same water tank 20. A suitable heating means 105 illustrated as a gas burner is positioned contiguous to the tank and may be used to heat the water supply. The hot water then flows through part of the piping shown in Fig. 8, that is, in the supply pipe 81 to the pump 82 through the riser 83 and part of the pipe 84 designated by the assembly numeral 106. There is then a drop pipe 107 connecting with the heat transfer radiator 95. From this through the medium of the drop pipe 96 part of the horizontal run 97 indicated by the numeral 108, the water is conveyed back to the water tank through the drain pipe 109. The direction of flow of the water in Figs. 8 and 9 is indicated by the solid arrows.

When the machine is used as in Fig. 9 to supply heated air to a room or building, it is apparent that the water supply of the spray 100 may be used or not dependent on the condition of the humidity of the air. In many districts of the country cold weather requiring internal house housing is frequently accompanied by rain producing a large humidity ratio in the external air. As this air is drawn into the building by the usual ventilation, thus the air in the building is sufficiently moist and the water spray may be discontinued. Also, the water cooling coils 90 are cut out by closing valves, hence the radiator receives the hot water at a desired temperature which with an open tank of course must be below the chilling point and is then used to heat the air draft which blows through the throat 40 in the direction of the arrow 71 of Fig. 7. In this case it is desirable to close the damper 56 thus blocking the outflow of air into the waste duct 55 and hence even with the rotor and air fans 27 and 28 operating, practically all of the air flow is directed through the throat 40 and hence into intimate contact with the radiator. The heated air is then driven under pressure by the centrifugal fan 50 through the duct 54. It is obvious that if the air does not require to be conveyed long distances through the duct 54 or a large volume of air supplied that the rotor may be brought to rest. This stops the blowing action of the fans 27 and 28 and also stops the centrifugal fan 35 causing the total flow of air to be developed by the centrifugal fan 50. It will thus be seen that with a simple change of valve connections as hereunder detailed and by heating the water, that the device may be transformed from an air cooling and moistening to a simple air heating equipment.

The equipment with very little additional features may be used as a positive air refrigerator, cooling the air by positive refrigerating action instead of merely by cooled water. This arrangement is illustrated in Fig. 10 showing diagrams of the flow both of the water for air conditioning or moistening and the refrigeration circuit. Dealing first with the water circulation designated by the assembly numeral 110, this again employs the open tank 20, the supply line 81 to the pump 82, a pressure feed through a pipe 111 connecting to the pipe 97 which in Fig. 8 is connected to the radiator 95. The standpipe 98 connected to 97 leads to the spray. The direction of flow of the water is indicated by the solid arrows 112, the direction of the spray water by the arrows 101. In this case the rotor is operating, the water is broken up into fine particles such as a mist, the large particles being carried out with the outwardly flow of air by centrifugal action and the central draft of air with a certain amount of the moisture is driven through the throat 40 and the heat transfer radiator 95. This however functions as a positive refrigerator in this case.

A refrigerating circuit designated by the numeral 120 employs the fluid tank 45 which is a closed tank and holds the liquid refrigerant. This tank is connected by a drop pipe 121 to a pressure release valve 122 from which there is an expansion pipe 123. This leads to the heat transfer radiator 95 where the liquid refrigerant expands into the gas rapidly extracting heat from the air blown through the throat 40 and thus through the radiator coils or other devices 95. The waste gas flows through the return pipes 124 and 125 to the gas compressor 126. After the compression of the gas back to the liquid form it is pumped by the compressor upwardly through the riser pipe 127, thence through connection pipes 128, 129 and the pipe 130 which includes a portion of the pipe 84 of Fig. 8 and 106 of Fig. 9. The continued flow leads through the drop pipe 85, flows through the cooling coils 90, utilizes part of the return pipe 91, the riser 131 connected thereto leading back to the refrigerant fluid tank 45. When the valves hereunder detailed are set to include the two distinct flow circuits, that of the spray water and of the refrigerant, it will be seen that a large proportion of the water circuit pipes may be used for the refrigerant and in this case the radiator has a reversal function over that of Fig. 9 in that there is a positive cooling and refrigerating action on the air passing through the throat 40. This air is driven by the fans 27 and 28 and is activated by these fans and the drum 30 into a circular rotation while travelling longitudinally. The water sprayed through the spray nozzle 100 is for a major portion discharged outwardly by a centrifugal action, the moist air passing over the water cooling coil 90, now used to cool the refrigerant liquid, chills such liquid prior to its return to the pipe 91 and the standpipe 101 to the fluid tank 45. The liquid refrigerant uses a good portion of the piping system and has its own distinct circuit, the compressor being a unit which may be brought into operation when desired and can be driven by a separate power equipment or from the shaft driving the rotor and the various blower and centrifugal fans. It will of course be understood that if desired the water spray into the air may be discontinued during refrigeration operation should the air be sufficiently moist. In fact, it may be necessary to discontinue this air moistening where there is danger of the refrigeration causing a precipitation of the water in the air due to the increased relative humidity at lower temperatures.

In Fig. 11 I illustrate the water and refrigerant flow diagram for all of the systems. The various pipes, fluid leads, etc. are designated by the numerals applying to Figs. 8, 9 and 10, however some of these numerals indicate different portions of the same piping connection. The manner in which one system of operation may be changed into another is through the control of the valves properly located in various pipes. For sake of convenience these are designated by letter. Presuming it is desired to use the equipment as an air conditioner by adding moisture and chilling by water cooling in accordance with the system of Fig. 8, the following valves would be opened, leading firstly from the spray jet 100. In the pipe 96 there is located a valve A, this being between the joint connecting the pipes 111 and 124 to 96. When this valve is opened it forms a connection to the radiator 95. The valve B in the pipe 91 forms a connection to the water cooling coil 90. A further connection through the open valve C and the open valve G connects with the pump. The pump may be shut off from the water tank by the valve I. In this procedure all of the other valves are closed.

When operating the system as an air heater by transference of heat from the water in accordance with the procedure of Fig. 9, the valve I connecting the pump and the water tank is open, the heater 105 of the tank is operated to heat the water. From the pump there is a flow through the pipe 83, the open valve G, the pipe 106, the open valve E in the pipe 107, leading to the radiator 95. A return valve H in the connection 108 and 109 leading from 96 is open. This returns the chilled water back to the water tank for again re-heating. In this circuit all of the other valves are closed. When the equipment is used for refrigerating, the cycle of the refrigerant is substantially as follows, having reference both to Figs. 10 and 11. The liquid refrigerant from the tank 45 passes through the pressure reduction valve 122 in the lead 121, thence through the open valve F, communicating by the pipe 123 with the heat transfer radiator 95, thence by the pipe 96, the open valve K in the connection 124 and 125 to the compressor 126. From the compressor there is a flow through the pipe 127 and 128, the open valve L, the connections 129 and 130, the open valve C, through the portion of the pipe 84 and 85 leading to the cooler coils 90 used in other procedures for water. There is then a return through the open valve D and the pipe 101 to the fluid tank. All of the other valves having a connection for circulating through the coils 90 are closed. This gives a complete cycle for the refrigerant.

When in refrigerating it is desired to spray water into the air, this is pumped from the water tank through the open valve I by the pump 82, thence through the pipe connection 111, the open valve J, the connection 97, 98 to the spray nozzle 100. The water from the spray which is not absorbed by the air is returned by gravity into the tank 20. In this procedure all of the other valves relating to the flow caused by the pump and to and from the water tank are closed except those designated as being open. The various valves used in open position for the several modes of operation are indicated in the diagrams of Figs. 8, 9 and 10.

The mechanical set up of my equipment as to a suitable form is illustrated in the drawings, Figs. 1 to 6 inclusive. In this, inside or connected with the housing structure I employ a front shaft support 150, this being located preferably immediately inside of the front wall 18 and the rear shaft support 151 shown as located immediately outside of the transverse end wall 47. The shaft 152 is mounted in suitable journals and at the rear end of the shaft there is a rotatable sleeve 153. The sleeve has a drive pulley 154 mounted thereon and the shaft has its own pulley 155. These have their respective belt drives 156 and 157 to the respective pulleys 158 and 159 on the driving shaft 160 of an electric motor 161.

The rotor assembly 25 includes the shaft and the drum or cylinder 29, these being illustrated as supported from the shaft by the blades of the forward and rear fans 27 and 28. Although in the diagrams only two sets of fans are shown, it is desirable to have additional fans such as indicated at 165, these being in part for the purpose of breaking up the globules of water into small particles. An additional structure for this purpose is to have one or more dispersing screens 166. These screens are preferably made in the manner illustrated in Fig. 6 having two opposite wire mesh screens 167' and 168' with a porous fabric 169 therebetween. This is secured to the shaft and to the drum in any suitable manner and hence rotates with the drum operating in part by the centrifugal action and by the air draft of the fans to convey the sprayed water through the dispensing screen and into the main portion of the drum. The centrifugal blower fan 35 is secured to the outside of drum adjacent its rear end and extends outwardly through a space 167 between the front transverse partition 42 and the rear end 168 of the cylinder 23. Such cylinder as above mentioned is stationary in the cabinet or housing structure. The water tank 20 is located in the base of the cabinet and it is intended that the upper surface of the water be always below the lower portion of the cylinder 23 or a partition such as 21 where this is utilized. The centrifugal fan 50 is connected to the rotatable sleeve 153 and its forward side has a spider construction 170 connected thereto, a narrow portion of the blades indicated at 171 is also attached to the sleeve, the transverse baffle wall 52 is in alignment with the spider, thus leaving the outwardly extending blades with openings or spaces indicated at 172. Thus the air passing through the throat 40 is acted upon by these blades of the centrifugal blower and driven outwardly.

In the water circulating system the pump 82 has a belt or equivalent drive 175 from the shaft of the motor 161. The piping may be arranged in any suitable manner. The water cooling coils 90 are preferably arranged by forming several banks 180 of pipes arranged in circles around the drum and inside of the cylinder 23. These are staggered so that the water discharged through the perforations 30 in the drum will impinge on the pipes. They are supplied with water by a header construction 181, note Figs. 1 and 5. The pipes are preferably mounted in perforations in strip metal 182, there being a large number of these strips which in effect form cooling fins for heat transference.

The radiator 95 for heat transference comprises preferably zig-zag turns of pipe as shown at 185 of Fig. 3. These have horizontal banks 186 of a group of pipes with reverse turns 187. The pipes are assembled providing a central space 188 for the passage of the shaft 152. It is also preferable to use a grill construction 189 to break up the current of air so that this is evenly distributed over the full area of the radiator. The radiator pipes are connected by attachment T's 190 and 191 at the top and bottom to the piping system for the water or the refrigerating fluid.

In the refrigerating mechanism the compressor condenser 126 is preferably located in an extension 195 of the housing. This has a disengageable drive from the electric motor and has the piping connections arranged in a suitable manner to the tank 45 for the refrigerant fluid. This as above mentioned is preferably located at the top of the machine.

From the above construction taken in connection with the diagram drawings, it will be seen that the centrifugal blower fan 50 operates at a higher speed than the rotor having the drum, and the fans 27 and 28 with the various blades to break up the spray of water. As the water is sprayed in the end of the drum, it is broken up into fine particles, that is, atomized, thus forming a mist and being brought into intimate contact with the air. Due to the centrifugal swirl developed by both the air and the water, the heavier particles of water are driven outwardly, contacting the drum 29 and being discharged through the perforations 30. This causes a spray of water to be directed at the cooling coil pipes 90. The drip from these pipes and the other portion of the water driven outwardly, drips into the tank 20. The flow of air as illustrated in Fig. 7 shows a longitudinal draft of air passing over the bank of pipes 90 and also the air with the water driven outwardly through the drum. This air is acted on by the centrifugal blower 35 and discharged outside of the cylinder 23 and having its only outlet through the waste duct 55 which is controlled by a damper 56. This gets rid of the excessively moist air. The drier air following along the line of the shaft 152 and the central portion of the drum is caught by the inwardly flared edge 41 of the stationary contracted or throat structure 40, this extending slightly inside of the rear end of the cylinder 29. Such air in passing through the throat is brought into intimate contact with the pipes or other structure of the refrigerator 95 where it is subjected to a cooling action in air cooling by water to a heating action when heated by water or to refrigeration when the refrigerant is pumped through the piping system. The centrifugal blower 50 is also operative to develop a suction aiding the flow of air through the throat and developing a sufficient pressure in the space 53 surrounding the blower fan to discharge the air through the duct 54 which may also be controlled by a damper, this leading to a room or building to be ventilated with temperature and humidity control by the equipment.

Although I have described my invention as relating to an air conditioning equipment, it will be apparent that with very slight changes it may be used to cool hot liquids flowing through the cooling coil 90 or the refrigerator coil 95. Also the same general construction could be used by enlarging these pipes and thus providing for cooling hot gases. In all these procedures for cooling either hot liquids or hot gases the water spray from the jet 100 would be used and in such instance the supply of this spray water could be much as shown in Fig. 10 from the water tank 20 by means of the pump 82 to the spray jet 100. For instance presuming it is desired to cool a hot liquid or hot gas, these could be supplied under pressure if desired to the pipe 121, note Fig. 10, this by omitting the fluid tank 45, thence either with or without the pressure reduction valve 122 and having the valve F open, there would be a flow through the pipe 123, the refrigerator coil 95, the connections 96, open valve K, 124, 125 to the device designated as the compressor 126. This if desired could be a positive pump drawing in the hot liquid or gas by suction or it could be omitted and merely form a connection between the pipes 125 and 127. The flow then continues through the pipes 128, 129, 130, 85, and the cooling coils 90, whence it is subject to the water spray action with a flow of air. The cooled liquid is then discharged through the pipe 91 and 131 to any suitable discharge connection omitting the fluid tank 45. With this or other modifications the device may function in addition as a liquid and gas cooler.

Various changes may be made in the details of the construction without departing from the spirit or scope of the invention as defined by the appended claims.

I claim:

1. In an air conditioning equipment the combination of a housing structure having an opening at one end, a rotatable perforated cylinder extending longitudinally of the housing and in axial alignment with the opening, air fans inside the cylinder, a stationary neck structure at the discharge end of the cylinder, a centrifugal blower connected to the exterior of the cylinder to create an air draft on the exterior of such cylinder, a second centrifugal blower located at the discharge end of said neck, means to spray moisture adjacent the air intake end of the cylinder only, the fans of the cylinder being adapted to develop a rotational swirl of the air and the water to discharge some of the water and air outwardly through the said perforations, the first centrifugal blower being adapted to discharge such air and the second centrifugal blower being adapted to discharge the air flowing centrally through the cylinder, the housing structure having a water tank in the bottom thereof to receive the surplus water from the spray, a piping system including connections from the water tank, a pump, a heat transfer radiator positioned in the neck and a piping connection from the radiator to the water spray.

2. In a device as described, the combination of a housing structure having an opening at one end, a perforated rotatable cylinder having an opening at both ends, means in the cylinder to develop a circular flow of air as to the axis of the cylinder and at the same time a motion of translation through the cylinder from the inlet to the discharge end, a stationary neck structure positioned adjacent the discharge end of the cylinder, a heat transfer radiator for fluids to flow therethrough positioned in the stationary neck, a blower positioned at the discharge end of the neck with means to conduct the air flow from such blower and means to develop a flow of fluid through the said radiator, a cooling coil for fluid surrounding the cylinder, a water spray device positioned adjacent the inlet end of the cylinder whereby water sprayed into the air is adapted to undergo a circular motion with the rotating air with part of the water being driven out through the perforations to contact the cooling coil and means to flow the fluid through the cooling coil in addition to the heat transfer radiator.

3. In an air conditioning equipment, the combination of a housing structure with an opening at one end, a water spray positioned adjacent such end, a rotating perforated cylinder mounted axially in the housing, a cylindrical blower connected to the exterior of the cylinder to create an air draft on the exterior thereof, there being an outlet for such air in the housing, an air blowing means positioned to blow the spray longitudinally through the cylinder and through the perforations thereof, means on the outside of the cylinder to discharge part of the air, a main outlet for the air at the end opposite the spray, the housing having a water tank at the bottom to receive the drip of excess water, a piping connection from the tank to the water spray with a pump pumping the water from the tank, the piping system including a water cooling coil positioned outside of the rotating cylinder and extending longitudinally thereof in a position to be subject to the flow of air on the exterior of the cylinder outwardly through the perforations of the cylinder and acted upon by the first centrifugal blower.

4. In an air conditioning equipment, the combination of a housing structure having an opening at one end, a rotatable perforated cylinder extending longitudinally of the housing and having an inlet aligned with the opening of the housing, air fans inside the cylinder, a stationary neck structure at the discharge end of the cylinder, a centrifugal blower at the discharge end of the neck with a discharge duct leading therefrom, a radiator for fluids located in the stationary neck with means to flow a fluid therethrough, a water tank located in the lower part of the housing, a pump connected thereto, a cooling coil surrounding the perforated cylinder and connected to the pump, the discharge from the cooling coil having a connection to the radiator, a spray jet located at the intake end of the perforated cylinder and a liquid connection from the radiator to the spray jet, a second centrifugal blower connected to the exterior of the perforated cylinder adjacent the forward end of the stationary neck and a discharge duct from the second centrifugal blower whereby a portion of the water spray with air is discharged by the second centrifugal blower developing a flow of moist air over the cooling coils surrounding the perforated cylinder.

5. In a device as described, the combination of a housing structure having an opening at one end, a perforated rotatable cylinder with openings at both ends aligned with the opening of the housing means in the cylinder to develop a circular flow of air as to the axis of the cylinder and at the same time a motion of translation, a stationary neck structure positioned adjacent the discharge end of the cylinder, a heat transfer radiator for flow of fluids therethrough positioned in the stationary neck, a blower positioned at the discharge end of the neck with an air discharge means and means to develop a flow of fluid through the radiator, the cylinder being perforated, a cooling coil for fluid surrounding the cylinder, a water spray device positioned adjacent the inlet end of the cylinder whereby water sprayed into the air is adapted to undergo a circular motion with the rotating part of the water being driven out through the perforations to contact the cooling coil and means to flow the fluid through the cooling coil in addition to the heat transfer radiator.

6. In air conditioning equipment the combination of a housing structure having an opening at one end, a rotatable perforated cylinder extending longitudinally of the housing and in axial alignment with the opening, air fans inside the cylinder, a stationary neck structure at the discharge end of the cylinder, a centrifugal blower connected to the exterior of the cylinder to create an air draft on the exterior of such cylinder, a second centrifugal blower located at the discharge end of said neck, means to spray moisture adjacent the air intake end of the cylinder only, the fans of the cylinder being adapted to develop a rotational swirl of the air and the water to discharge some of the water and air outwardly through the said perforations, the first centrifugal blower being adapted to discharge such air and the second centrifugal blower being adapted to discharge the air flowing centrally through the cylinder, the housing having a water tank at the bottom to receive the drip of excess water, a piping connection from the tank to the water spray with a pump pumping the water from the tank, the piping system including a water cooling coil positioned outside of the rotating cylinder and extending longitudinally thereof in a position to be subject to the flow of air on the exterior of the cylinder outwardly through the perforations of the cylinder and acted upon by the first centrifugal blower.

7. In an air conditioning equipment, the combination of a housing structure having an opening at one end, a rotatable perforated cylinder extending longitudinally of the housing and having an inlet end aligned with the opening of the housing, air fans inside of the cylinder, a stationary neck structure at the discharge end of the cylinder, a centrifugal blower at the discharge end of the neck with a duct for the discharge of air therefrom, a radiator for fluids located in the stationary neck with means to flow a fluid therethrough whereby air blown longitudinally through the cylinder and the stationary neck flows through the said radiator and is discharged by the centrifugal blower, a water tank located in the lower part of the housing, a pump connected thereto, a cooling coil surrounding the perforated cylinder and connected to the pump, the discharge from the cooling coil having a connection to the radiator, a spray jet located at the intake end of the perforated cylinder and a liquid connection from the radiator to the spray jet, a second centrifugal blower connected to the exterior of the perforated cylinder adjacent the forward end of the stationary neck and a discharge duct from the second centrifugal blower whereby a portion of the water spray with air is discharged by the second centrifugal blower developing a flow of moist air over the cooling coils surrounding the perforated cylinder.

NICKOLAS GYMNAITES